Sept. 20, 1971   B. J. LANDREE   3,606,525
SPRING FOR EYEGLASS FRAMES
Filed Oct. 24, 1969
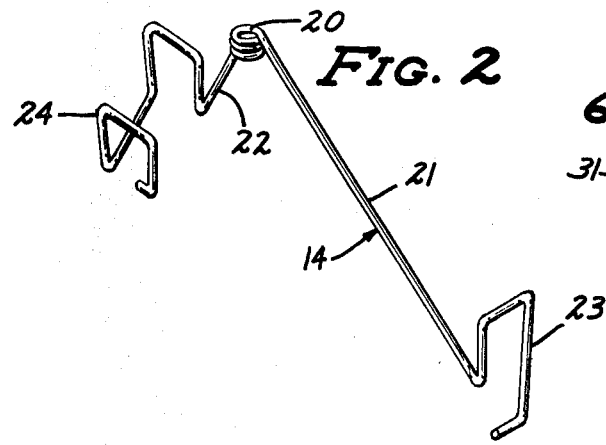
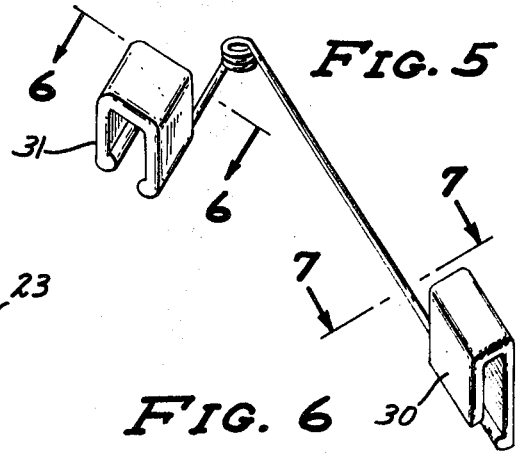
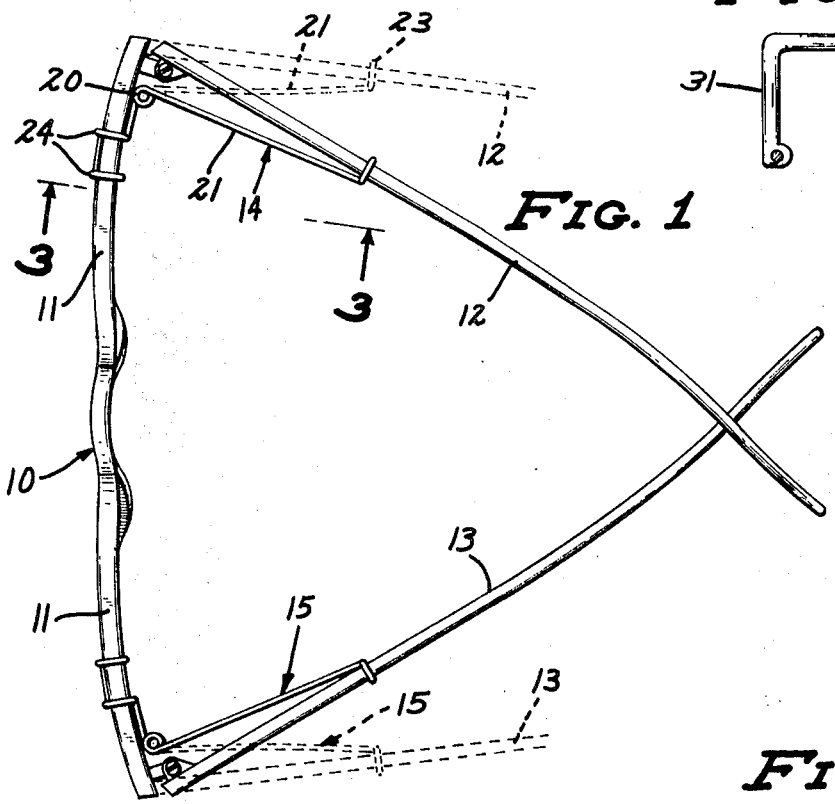
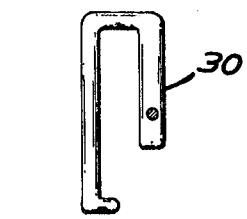
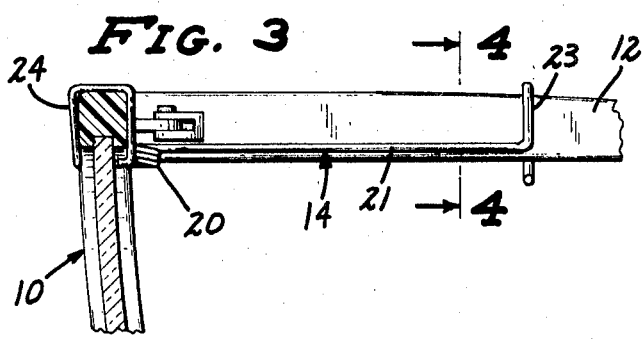
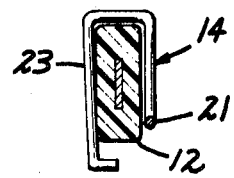
INVENTOR.
BERT J. LANDREE
BY
Merchant & Gould
ATTORNEYS

United States Patent Office 3,606,525
Patented Sept. 20, 1971

3,606,525
SPRING FOR EYEGLASS FRAMES
Bert J. Landree, 6009 Ewing St. S.,
Edina, Minn. 55410
Filed Oct. 24, 1969, Ser. No. 869,113
Int. Cl. G02c 5/16
U.S. Cl. 351—113                                      3 Claims

ABSTRACT OF THE DISCLOSURE

An elongated piece of resilient wire formed into a torsion coil spring with end portions extending outwardly therefrom, the end portions formed to engage the frame to prevent relative transverse movement therebetween while allowing longitudinal movement and biasing the arms of the frame inwardly toward the lens holding portion.

BACKGROUND OF THE INVENTION

Field of the invention

Eyeglass frames, after long periods of usage, have a tendency to lose their original resiliency (if any natural resiliency was built into the eyeglasses) so that the arms pivot outwardly too far and do not grip the sides of the head of a wearer as they should. Consequently, the frames easily slip down on the nose of the wearer and become extremely uncomfortable and awkward to maintain in position.

Description of the prior art

Several types of spring devices have been designed to apply a bias to the arms of eyeglass frames so that they will grip the sides of a wearer's head more tightly. Typical examples of these prior art devices are Pyle Pat. No. 347,738, Meyrowitz Pat. No. 1,310,203, and Le Doux Pat. No. 1,942,298. All of these prior art devices require dismantling of the eyeglass frames and modifying the frames to install the device. The device is then permanently installed and the eyeglass frames are reassembled. This is undesirable because of the cost and time expended in installing the device and, in many instances, the devices will not operate or cannot be installed in all types of eyeglass frames.

SUMMARY OF THE INVENTION

The present invention pertains to an improved spring for eyeglass frames including an elongated piece of resilient wire formed into a torsion coil spring with end portions extending outwardly therefrom having fastening means affixed thereto for removably fastening the spring onto an arm and the lens holding portion of the frame so as to provide a bias on the arm urging it inwardly toward the lens holding portion of the frame.

It is an object of the present invention to provide an improved spring for eyeglass frames.

It is a further object of the present invention to provide an improved spring for eyeglass frames which can be easily installed or removed without dismantling or modifying the eyeglass frames.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is a view in top plan of eyeglass frames having two of the present springs attached thereto, illustrating in dotted lines the position of the arms when the eyeglass frames are engaged on a wearer;

FIG. 2 is an enlarged view in perspective of the present spring;

FIG. 3 is an enlarged sectional view as seen from the line 3—3 in FIG. 1;

FIG. 4 is an enlarged sectional view as seen from the line 4—4 in FIG. 3;

FIG. 5 is a view in perspective, similar to FIG. 2, of another embodiment of the present spring;

FIG. 6 is an enlarged sectional view as seen from the line 6—6 in FIG. 5; and

FIG. 7 is an enlarged sectional view as seen from the line 7—7 in FIG. 5.

DESCRIPTION OF THE PREFERRED EMBODIMENTS

Referring more specifically to the figures, the numeral 10 generally designates eyeglass frames having a lens holding portion 11 and pivotally connected arms 12 and 13. An improved spring generally designated 14 is connected between the lens holding portion 11 and the arm 12 and an improved spring generally designated 15 is connected between the lens holding portion 11 and the arm 13. Since the springs 14 and 15 are mirror images, only the spring 14 will be described in detail.

The spring 14 is formed from an elongated piece of resilient wire, such as spring steel or the like, with a torsion coil spring 20 formed in the central portion thereof so that portions 21 and 22 extend outwardly therefrom in an angularly spaced apart relationship. The outwardly extending end of the portion 21 has a generally rectangularly shaped portion 23 integrally formed therein, which portion 23 is formed to partially encircle and engage the arm 12 to prevent transverse movements of the portion 21 relative to the arm 12 while allowing longitudinal movements of the portion 23 along the arm 12. The end of the portion 22 has a double-looped portion 24 integrally formed therein, which portion 24 is designed to fit over and engage the upper edge of the lens holding portion 11 to substantially prevent transverse movements of the portion 22 relative to the lens holding portion 11 while allowing longitudinal movements of the portion 24 relative to the lens holding portion 11, if necessary. Thus, the portion 23 and the portion 24 of the spring 14 are fastening means for affixing the spring 14 onto the eyeglass frames 10 in an operative position.

With the spring 14 operatively mounted on the frames 10 the torsion coil spring 20 is positioned adjacent the pivot point of the arm 12 and between the lens holding portion 11 and the arm 12, or inwardly from the pivot point toward the head of the wearer. The portions 23 and 24 are constructed so that they will easily slip over the arm 12 and the upper edge of the lens holding portion 11, respectively, to engage or disengage the spring 14 from the frame 10. The angular displacement between the portions 21 and 22 is sufficient to normally maintain the arm 12 pivoted inwardly toward the lens holding portion 11 a substantial distance from the position it assumes when the frames 10 are correctly oriented on the head of a wearer. As the arm 12 is pivoted outwardly from the lens holding portion 11 the spring 14 produces a bias on the arm 12 urging it inwardly toward the normal position.

It should be understood that many embodiments of the fastening means (portions 23 and 24) might be designed by those skilled in the art and one such alternate embodiment is illustrated in FIGS. 5-7. In these figures the integrally attached portions 23 and 24 are replaced with clips 30 and 31, respectively. In this embodiment the clips 30 and 31 are molded from a relatively resilient plastic but, it should be understood that many other types of material and processes of forming might be utilized if desired. The clip 30 is formed with a cross section substantially similar to the outline of the portion 23 and elongated to form a channel for receiving the arm 12 therein. The clip 31 is formed similar to the portion 24, except that it is a solid configuration rather than the double-looped configuration, and also defines a channel for receiving the upper edge of the lens holding portion 11 therein. Many other forms of the clips 30 and 31 may be devised by those skilled in the art to perform the function of affixing the spring onto the frame 10 in the manner previously described.

Thus, an improved spring for eyeglass frames is disclosed which can be quickly and easily installed on the frames without dismantling or modifying the frames and can be as easily removed when desired. The improved springs, when installed on the eyeglass frames, provide a bias on the arms 12 and 13 urging them inwardly toward each other and the lens holding portion 11 so that the frame 10 produces a slight pressure against the sides of the head of the wearer to hold the frames comfortably in the correct position. Further, if the springs should lose their resiliency or break, through some misuse or manufacturing defect, new springs can quickly and easily be installed by the wearer with no necessity to purchase new frames or go through a period of installation during which the frames cannot be used.

What is claimed is:
1. An improved spring attachment for unmodified eyeglass frames having a lens holding portion with pivotally mounted arms at each side thereof comprising:
   (a) an elongated piece of resilient wire formed into a torsion coil spring having end portions extending outwardly therefrom;
   (b) fastening means affixed to said end portions for removably but fixedly fastening one of said end portions to the lens holding portion of the frame and removably but slidably fastening the other of said end portions to one of the arms without modifying the structure of the eyeglass frames;
   (c) said torsion coil spring being positioned inwardly of the pivot point of the arm; and
   (d) the end portions of said resilient wire being oriented relative to each other so as to provide a bias on the arm urging it inwardly toward the lens holding portion of the frame.

2. An improved spring as set forth in claim 1 wherein the wire is characterized by defining an angle between the end portions thereof less than 90°.

3. An improved spring as set forth in claim 1 wherein the fastening means are an integral part of the resilient wire.

References Cited
UNITED STATES PATENTS

| | | | |
|---|---|---|---|
| 1,942,298 | 1/1934 | Le Doux | 351—113 |
| 2,367,418 | 1/1945 | Morrell | 351—113U |

DAVID SCHONBERG, Primary Examiner

J. W. LEONARD, Assistant Examiner

U.S. Cl. X.R.

16—180; 267—155; 351—121